(12) United States Patent
Ishida et al.

(10) Patent No.: US 12,109,963 B2
(45) Date of Patent: Oct. 8, 2024

(54) STEERING WHEEL

(71) Applicant: Autoliv Development AB, Vargarda (SE)

(72) Inventors: Ryotaro Ishida, Kanagawa (JP);
Kazuhiro Abe, Kanagawa (JP);
Keisuke Honma, Kanagawa (JP);
Hiroyoshi Shimono, Kanagawa (JP);
Sumit Kumar, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 20 days.

(21) Appl. No.: 17/906,546

(22) PCT Filed: Jan. 13, 2021

(86) PCT No.: PCT/JP2021/000750
§ 371 (c)(1),
(2) Date: Sep. 16, 2022

(87) PCT Pub. No.: WO2021/192496
PCT Pub. Date: Sep. 30, 2021

(65) Prior Publication Data
US 2023/0234529 A1   Jul. 27, 2023

(30) Foreign Application Priority Data

Mar. 23, 2020   (JP) .................................. 2020-050765

(51) Int. Cl.
*B60R 21/203* (2006.01)
*B62D 1/04* (2006.01)

(52) U.S. Cl.
CPC ............ *B60R 21/2037* (2013.01); *B62D 1/04* (2013.01); *B60Y 2400/83* (2013.01)

(58) Field of Classification Search
CPC ..... B60R 21/2037; B60R 21/203; B62D 1/04; B60Y 2400/83
See application file for complete search history.

(56) References Cited

U.S. PATENT DOCUMENTS

| | | | | |
|---|---|---|---|---|
| 5,228,362 A | * | 7/1993 | Chen .................... | B60R 21/2037 74/552 |
| 5,350,190 A | * | 9/1994 | Szigethy ............. | B60R 21/2037 200/61.55 |
| 5,410,114 A | * | 4/1995 | Furuie .................... | B60Q 5/003 200/61.55 |

(Continued)

FOREIGN PATENT DOCUMENTS

| | | |
|---|---|---|
| DE | 102014015621 A1 | 4/2016 |
| JP | 2012-512089 A | 5/2012 |
| JP | 2020-26263 A | 2/2020 |

*Primary Examiner* — Frank B Vanaman
(74) *Attorney, Agent, or Firm* — Foley & Lardner LLP

(57) ABSTRACT

A steering wheel includes a steering wheel body, an airbag module, and a damper unit that connects the steering wheel body and the airbag module. The airbag module is mounted to the steering wheel body via the damper unit facing in a Z-axis first direction that is an example of a first direction. The damper unit is configured to apply a force on the airbag module in a state where the airbag module is mounted on the steering wheel body in a direction of pushing up the airbag module in a direction that intersects with the Z-axis first direction.

12 Claims, 18 Drawing Sheets

(56) References Cited

U.S. PATENT DOCUMENTS

| | | | | |
|---|---|---|---|---|
| 5,627,352 | A * | 5/1997 | Suzuki | B60Q 5/003 200/61.54 |
| 5,853,190 | A * | 12/1998 | Rion | B60R 21/217 280/728.2 |
| 6,164,690 | A * | 12/2000 | Vian | B60R 21/2037 74/552 |
| 8,720,942 | B2 * | 5/2014 | Onohara | B60R 21/2037 74/552 |
| 9,195,257 | B2 * | 11/2015 | Miyahara | G05G 1/10 |
| 2005/0151354 | A1 * | 7/2005 | Sugimoto | B60Q 5/003 280/731 |
| 2005/0230943 | A1 * | 10/2005 | Thomas | B60R 21/2037 200/61.55 |
| 2006/0197323 | A1 * | 9/2006 | Pillsbury | B60Q 5/003 280/728.2 |
| 2018/0215337 | A1 | 8/2018 | Burel et al. | |
| 2020/0017057 | A1 * | 1/2020 | Hirota | B60R 21/2037 |

* cited by examiner

STEERING WHEEL

TECHNICAL FIELD

The present invention relates to a steering wheel.

BACKGROUND ART

In recent years steering wheels having a front airbag function have been widely utilized to protect the safety of a driver. For example, in the airbag device disclosed in Patent Document 1, a folded airbag is stowed between a bag holder to which a horn switch mechanism is attached and a pad attached to the bag holder. The horn switch mechanism is assembled by being inserted into a mounting hole formed in the bag holder, and the pad is provided with a switch support part for supporting the horn switch mechanism.

PRIOR ART DOCUMENTS

Patent Documents

Patent Document 1 Japanese Unexamined Patent Application 2010-69938

SUMMARY OF THE INVENTION

Problem to be Solved by the Invention

After the airbag module such as the airbag device disclosed in Patent Document 1 is mounted to the steering wheel body, the airbag module may slide down slightly due to its own weight, and may be in an offset position with respect to the steering wheel body. If this manner of offset position occurs, for example, the gap between the airbag module and the steering wheel body may be large on the upper side and smaller on the lower side, thereby degrading the creative look of the steering wheel as a whole.

An object of the present invention is to provide a steering wheel that contributes to improving the creative look of the steering wheel as a whole.

Means to Solve the Problem

A steering wheel according to a first aspect of the present invention includes:
  a steering wheel body;
  an airbag module; and
  a damper unit connecting the steering wheel body and the airbag module;
  wherein
  the airbag module is mounted on the steering wheel body via the damper unit in a first direction, and
  the damper unit is configured to apply a force on the airbag module in a direction of pushing up the airbag module that is a direction that intersects with the first direction in a state where the airbag module is mounted on the steering wheel body.

According to this aspect, in a state of being mounted to the steering wheel body via the damper unit in the first direction, the airbag module is pushed up by the damper unit in a direction that intersects with the mounting direction (in other words, the first direction). As a result, the sliding down of the airbag module due to its own weight is suppressed enabling retaining the airbag module in the true mounting position thereof relative to the steering wheel body. Therefore, overall improvement of the creative look of the steering wheel can be achieved. In addition, the function of the damper unit that connects the steering wheel body and the airbag module can be effectively used to push up the airbag module as described above. Here, the function of the damper unit is the function of the damper unit damping the vibration while transmitting the vibration of the steering wheel body to the airbag module.

A steering wheel according to another aspect of the present invention includes:
  a steering wheel body;
  an airbag module; and
  a damper unit that connects the steering wheel body and the airbag module;
  wherein
  the airbag module is mounted to the steering wheel body via the damper unit facing a first direction, and
  the steering wheel includes at least one elastic body provided between the airbag module and the steering wheel body that biases the airbag module in a direction of pushing up the airbag module in a direction that intersects with the first direction, in a state of the airbag module being mounted on the steering wheel body.

According to this aspect, similar to that described above, in a state of being mounted to the steering wheel body via the damper unit in the first direction, the airbag module is pushed up by an elastic body in a direction that intersects with the mounting direction (in other words, the first direction). Therefore, similar to that described above, the sliding down of the airbag module due to its own weight is suppressed, and the creative look of the steering wheel as a whole can be improved.

Here, although the elastic body is a separate body from the damper unit, a support spring conventionally employed in a front airbag can be used, for example.

DESCRIPTION OF THE PREFERRED EMBODIMENTS

Figure 1:
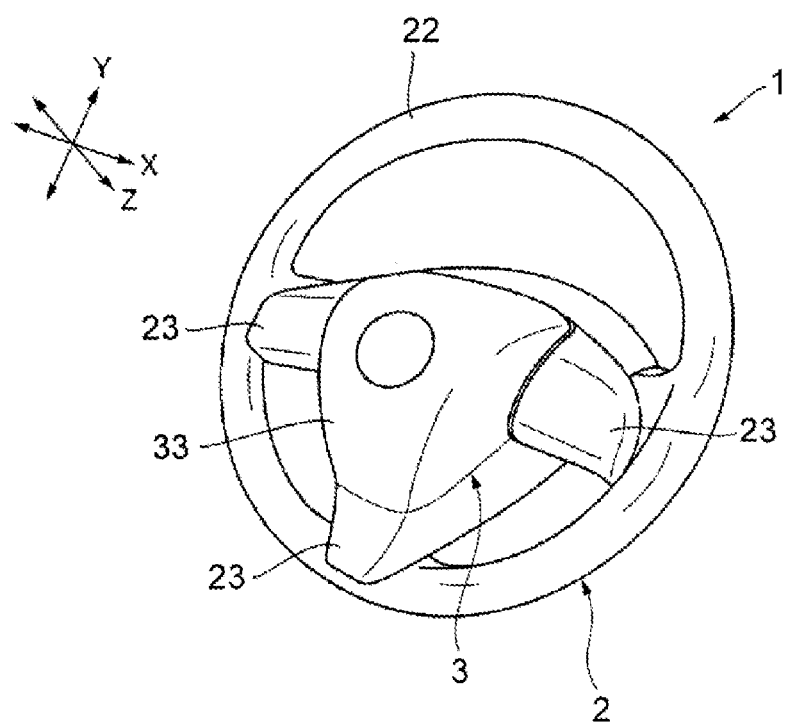
FIG. 1 is a perspective view illustrating the appearance of a steering wheel according to Example 1 of Embodiment 1.

Embodiments of the present invention will be described hereinafter. In the description of the accompanying drawings, the same or similar components are denoted by the same or similar reference numerals. The drawings are examples, and the dimensions and shapes of each part are illustrative. In addition, in the following, one or more Examples will be described for each of the plurality of Embodiments, but in the later Examples, descriptions of common matters with the previous Examples will be omitted, and different points will be described. In particular, no mention is made of similar actions and effects due to similar configurations.

Major Common Matters of Multiple Embodiments

The steering wheel according to a plurality of Embodiments is arranged on the driver seat side of a vehicle such as an automobile, and has a plurality of functions. For example, the steering wheel has a function as a steering device for a vehicle, a function as a front airbag in case of a vehicle emergency, and a function as a dynamic damper for damping vibration of the steering wheel body. An example of a vehicle emergency is a time when a vehicle collision occurs. The steering wheel functioning as a front airbag is mainly achieved by an airbag module mounted on the steering wheel. The steering wheel functioning as a dynamic damper is mainly achieved by at least one damper unit provided between the airbag module and the steering wheel body. In addition to the functions described above, the steering wheel has a function of pushing up the airbag module in order to retain the position of the airbag module relative to the steering wheel body. Moreover, the steering wheel may also function as a horn device.

In the steering wheel according to a plurality of Embodiments, the airbag module is attached to the steering wheel body via at least one damper unit in a first direction. The aforementioned "first direction" can be, for example, the axial direction or the longitudinal direction of the steering shaft. The steering shaft is generally provided in the vehicle body at an inclined state, and the steering wheel is attached to the upper end of the steering shaft. Steering force from the driver is transmitted from the steering wheel to the steering shaft, and transmitted to wheels via a steering gear or the like, thereby changing the direction of the wheels. In addition, the airbag module and steering wheel body each have a prescribed thickness, and considering that these have a stacked arrangement in order along the thickness direction thereof, the "first direction" can be, for example, the thickness direction of the airbag module, steering wheel body, or steering wheel, or the stacking direction of the airbag module and steering wheel body. Furthermore, considering that the steering wheel body broadly defines a plane in a direction orthogonal to the thickness direction thereof, the "first direction" can also be, for example, the direction perpendicular to the plane of the steering wheel body. In the following description, it is assumed that the "first direction" corresponds to the axial direction of the steering shaft.

In the steering wheel according to a plurality of Embodiments, the airbag module is pushed up in a direction intersecting the "first direction" in a state where the airbag module is attached to the steering wheel body. This suppresses sliding down of the airbag module due to its own weight. Such lifting function is achieved, in some Embodiments (for example Embodiments 1 and 2 described below) primarily by at lease one damper unit. In some other Embodiments (for example Embodiment 3 described below), the lifting function is achieved by an elastic body separate from the damper unit.

Hereinafter, for convenience of explanation, the state where the steering wheel is attached to the vehicle and is not subjected to external force may be referred to as the "attached state." In addition, the axial direction of the steering shaft (in other words the first direction) shall be called the "Z-axis direction." In a plane orthogonal to the Z-axis direction, the direction connecting 9 o'clock and 3 o'clock (on an analog 12-hour clock) shall be the "X-axis direction," and the direction connecting 12 o'clock and 6 o'clock (on the same analog clock) shall be the "Y-axis direction." It can be said that the X-axis direction corresponds to the width direction of the steering wheel or vehicle. The Y-axis direction is the vertical direction of the steering wheel. Note that when the steering shaft is tilted, the Y-axis direction is tilted with respect to the height direction of the vehicle. In addition, a plane formed by any two of the X-axis, Y-axis, and Z-axis shall be referred to as "XY plane," "YZ plane," or "XZ plane." In the Z-axis direction, the Z-axis first direction is directed toward the lower end part of the steering shaft, and the Z-axis second direction is directed toward the upper end part of the steering shaft (toward the driver). In the Y-axis direction, the Y-axis first direction is directed upward in the height direction of the vehicle, and the Y-axis second direction is directed downward in the height direction of the vehicle.

Embodiment 1

Example 1

Figure 2:
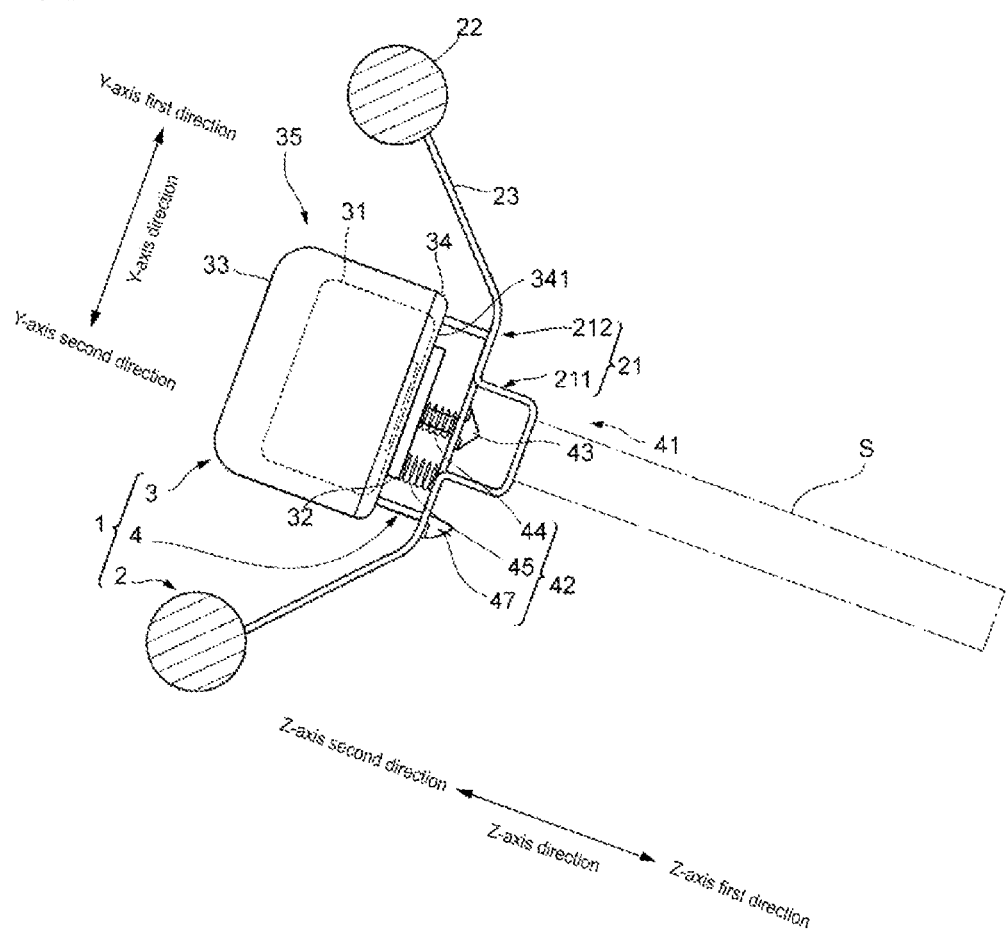
FIG. 2 is a schematic cross-sectional view illustrating the structure of the steering wheel in FIG. 1.

As illustrated in FIGS. 1 and 2, the steering wheel 1 includes a steering wheel body 2, an airbag module 3, and a damper unit 4 connecting the steering wheel body 2 and the airbag module 3. The damper unit 4 is provided between the steering wheel body 2 and the airbag module 3. The airbag module 3 is attached to the steering wheel body 2 via the damper unit 4 in the Z-axis direction. In this attached state, the airbag module 3 and the damper unit 4 are provided so as to be embedded in the center of the steering wheel body 2.

The steering wheel body 2 functions as a vehicle steering device. The steering wheel body 2 has a core bar that constitutes the framework thereof. The core bar is made from, for example, metal such as iron, aluminum, or magnesium, resin, or the like. The core bar of the steering wheel body 2 has a central boss region 21, a circular rim 22 gripped by the driver, and spokes 23 connecting the boss region 21 and the rim 22. The boss region 21 has a shaft mounting part 211 for connecting the steering wheel body 2 to the steering shaft S, and a damper mounting part 212 for mounting the damper unit 4 (see FIG. 5). The shaft mounting part 211 is formed in the central portion of the boss region 21, while the damper mounting part 212 is formed outside the shaft mounting part 211. The shaft mounting part 211 has a mounting hole for mounting the steering shaft S thereon. Details of the damper mounting part 212 will be described later.

The steering wheel body 2 may have one or more layers on the core bar. For example, the steering wheel body 2 may be provided with a soft synthetic resin coating layer, such as foamed polyurethane resin, on the core bar for partial or full cover. The steering wheel body 2 can have a urethane layer as an insulating layer, a heating electrode layer for heating the steering wheel body 2, a surface skin layer as an insulating layer, and a layer of sensor electrodes for detecting gripping of the steering wheel body 2 by the driver.

The airbag module 3 has a function as a front airbag and a function as a horn device. The airbag module 3 includes a folded bag-shaped airbag cushion 31, an inflator 32 that supplies gas to the airbag cushion 31 in case of vehicle emergency, and a horn cover 33 and housing 34 that cover the boss region 21 of the steering wheel body 2 from the driver side. The horn cover 33 constitutes the designed surface of the steering wheel 1 facing the driver, that is, the visible portion, while the airbag cushion 31, the inflator 32, and the housing 34 are portions that are not visible.

The inflator 32 is a heavy object made of metal, and is the heaviest component of the airbag module 3. Therefore, the position or center of gravity of the inflator 32 is substantially the center of gravity G of the airbag module 3 (see FIG. 3). For example, if the inflator 32 has a low-profile hollow disc body with gas ejection holes, the center of the hollow disc body can substantially become the center of gravity G of the airbag module 3. On the other hand, the center of the airbag module 3 can also be the center of gravity G of the airbag module 3. However, it is also possible to consider the center of the largest component among the components of the airbag module 3 (for example, the horn cover 33) as the center of the airbag module 3.

Figure 4:
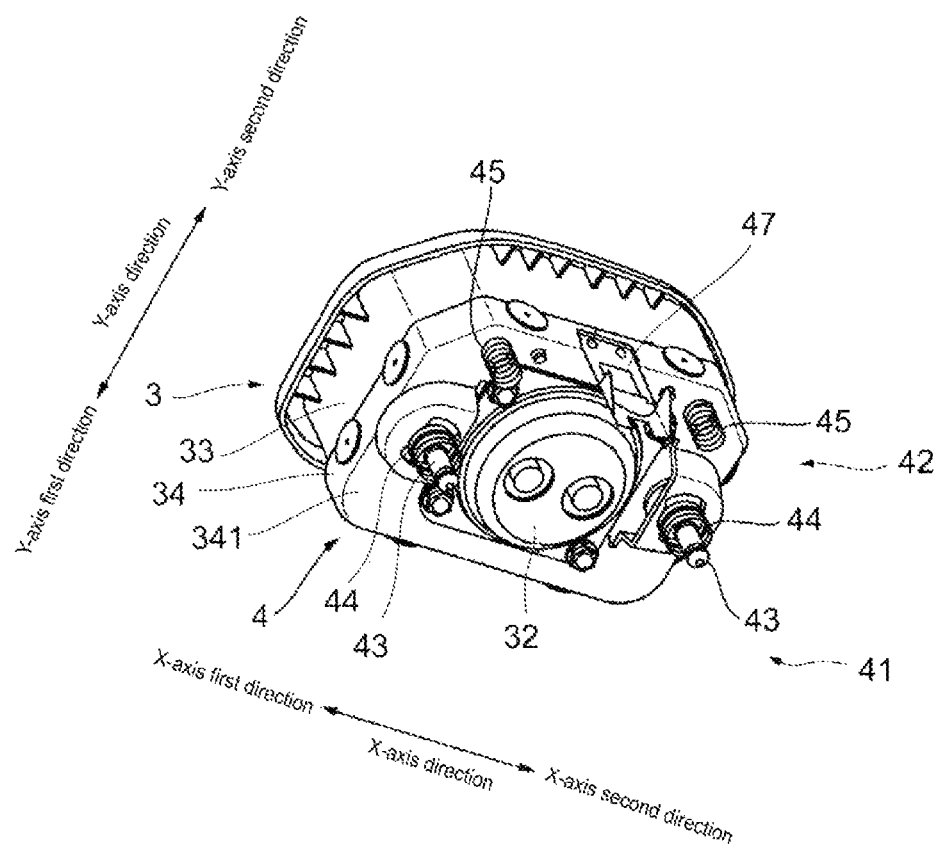
FIG. 4 is a perspective view illustrating the structure of a damper unit of the steering wheel of FIG. 1.

The horn cover 33 is made of resin, for example, and has a box shape overall (see FIG. 4). The housing 34 is made of metal, for example, and has a plate shape overall (see FIG. 4). The horn cover 33 and housing 34 constitute a receptacle 35 where the airbag cushion 31 is stowed. The housing 34 has a bottom surface (first main surface 341) along the XY plane, and the inflator 32 is mounted at the center of the first main surface 341. Further, regarding the housing 34, the horn cover 33 is attached by, for example, rivets to a peripheral wall rising from the first main surface 341.

The horn cover 33 is a part that becomes a horn switch pressed by the driver when sounding the horn. The airbag module 3 is configured to be slidable in the Z-axis direction with respect to the steering wheel body 2 via the damper unit 4. When the driver pushes the horn cover 33 in the Z-axis direction, the airbag module 3 approaches the steering wheel body 2 against the biasing force of the damper unit 4. At this time, the contacts respectively provided on the airbag module 3 and the steering wheel body 2 provide electrical conduction, and the horn sounds.

In a vehicle emergency, the airbag module 3 is activated as a front airbag. Specifically, during a collision, the inflator 32 receives a signal from a vehicle sensor and activates to begin supplying gas to the airbag cushion 31. The airbag cushion 31 supplied with gas rapidly inflates and ruptures the horn cover 33, and further inflates from the ruptured horn cover 33 toward the driver side of the vehicle compartment space. As a result, the fully inflated airbag cushion 31 restrains the driver.

Figure 3:
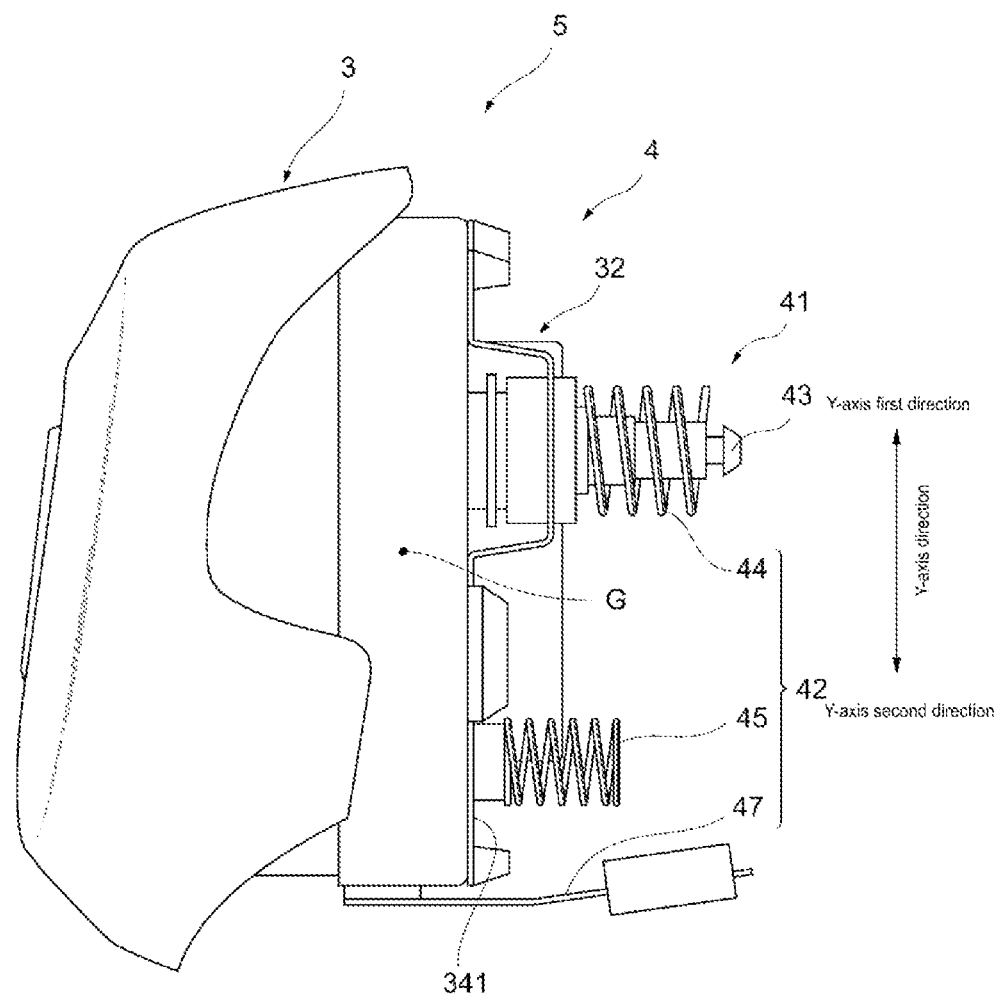
FIG. 3 is a side view illustrating the structure of a damper unit of the steering wheel of FIG. 1.

As illustrated in FIGS. 3 and 4, the damper unit 4 includes an engaging part 41 that movably engages the airbag module 3 with the steering wheel body 2 and a damper part 42 that connects the steering wheel body 2 and the airbag module 3. The engaging part 41 and the damper part 42 are configured to be attachable to the housing 34 first main surface 341 of the airbag module 3.

Note that when attaching the airbag module 3 to the steering wheel body 2 via the damper unit 4, the damper unit 4 is attached to the airbag module 3 in advance. Therefore, in the following description, the damper unit 4 and the airbag module 3 may be collectively referred to as an "airbag damper assembly 5."

The engaging part 41 has two pins 43. The two pins 43 are provided so as to protrude from the first main surface 341 of the housing 34 in the Z-axis first direction. In addition, the two pins 43 are arranged on both left and right sides of the center of the airbag module 3. Specifically, each of the two pins 43 is arranged on both end sides in the X-axis direction and above the center of gravity G of the airbag module 3, that is, on the Y-axis first direction side.

The damper part 42 has two engaging part springs 44, two support springs 45 and one plate-shaped damper 47. One or both of the engaging part springs 44 and the support springs 45 can be a coil spring that provides bias in the direction of pushing the airbag module 3 up. Here, the two engaging part springs 44 are compression coil springs with the same mutual specifications, and the two support springs 45 are also compression coil springs with the same mutual specifications. The coil diameter of the support springs 45 is smaller than the coil diameter of the engaging part springs 44.

The two engaging part springs 44 are provided on the outer peripheral sides of the two pins 43, respectively. Therefore, similar to the two pins 43, the two engaging part springs 44 are arranged on both ends in the X-axis direction and above the center of gravity G of the airbag module 3. The two support springs 45 are arranged on both left and right sides of the center of the airbag module 3 and below the two engaging part springs 44 respectively. Specifically, the two support springs 45 are arranged on both end sides in the X-axis direction and below the center of gravity G of the airbag module 3, that is, on the Y-axis second direction side.

The end parts of both the engaging part springs 44 and support springs 45 in the Z-axis first direction contact the end part of the steering wheel body 2 in the Z-axis second direction. In the state before being attached to the steering wheel body 2, that is, in the state of the airbag damper assembly 5, the end parts of both the engaging part springs 44 and the support springs 45 in the Z-axis second direction are secured end parts, with the end parts in Z-axis first direction being free end parts. The secured end parts and the free end parts are examples of the "first end part" and "second end part" described in the claims below, respectively.

The plate-shaped damper 47 is provided at the end of the airbag module 3 in the Y-axis second direction so as to protrude from the first main surface 341 of the housing 34 in the Z-axis first direction. In the plate-shaped damper 47, the end part of the Z-axis second direction side is a secured end part, and the end part of the Z-axis first direction side is a free end part. The plate-shaped damper 47 is arranged below the center of the airbag module 3. Specifically, the plate-shaped damper 47 is arranged closer to the center side in the X-axis direction than the two engaging part springs 44 and the two support springs 45 and below the center of gravity G of the airbag module 3, that is, on the Y-axis second direction side.

Damper Mounting Part 212 of Steering Wheel Body 2

Next, the configuration of the damper mounting part 212 of the steering wheel body 2 will be described with reference to FIGS. 5 and 6.

Figure 5:
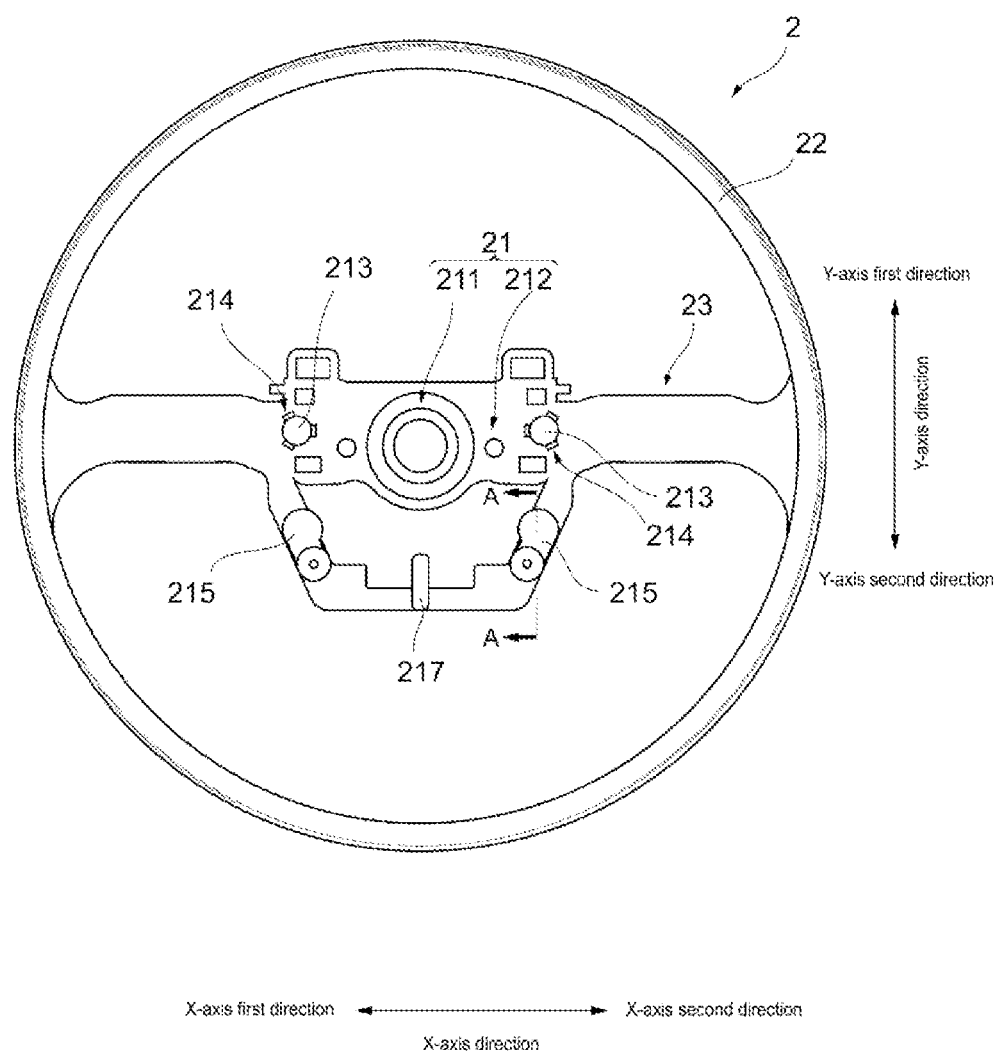
FIG. 5 is a front view illustrating the structure of a steering wheel body of the steering wheel of FIG. 1.

The damper mounting part 212, as illustrated in FIG. 5, has two mounting through-holes 213 for inserting the two pins 43, two flat parts 214 for receiving the free ends of the two engaging part springs 44 respectively, two bearing surfaces 215 for receiving the free ends of the two support springs 45 respectively, and a flat part 217 corresponding to the free end of the plate-shaped damper 47. The flat part 214 and the flat part 217 are parallel to the XY plane.

Figure 6:
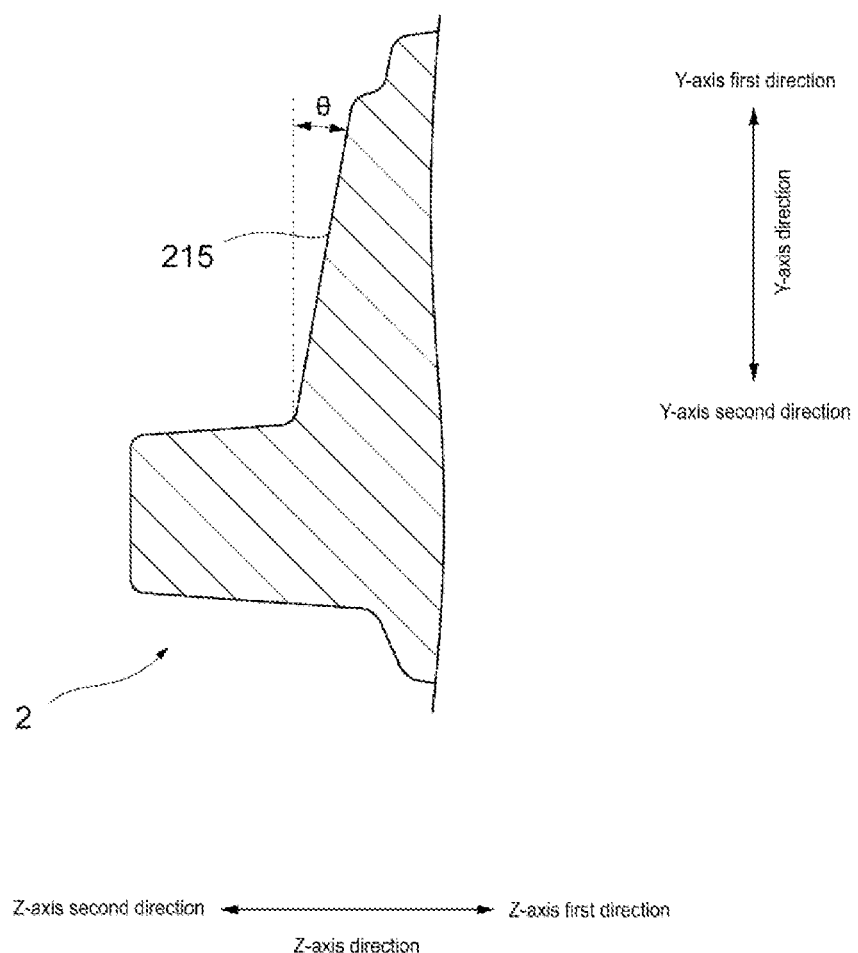
FIG. 6 is a cross-sectional drawing along line A-A in FIG. 5.

The bearing surface 215 is formed as an inclined surface that is inclined with respect to the XY plane, as illustrated in FIG. 6. More specifically, in the attached state, the bearing surface 215 is arranged such that the lower end part arranged in the Y-axis second direction is closer to the airbag module 3 side than the upper end part arranged in the Y-axis first direction. Due to this inclination, a force component in the direction of pushing up the airbag module 3 is applied to the damper unit 4 (here, the support springs 45). The angle of this inclination, or the angle θ between the bearing surface 215 and the XY plane, may be an angle that allows such a force component to act, and can be set, for example, in the range of 3 degrees to 30 degrees, preferably in the range of 10 to 20 degrees. This is due to the fact that if the angle is less than 10 degrees, the airbag module 3 cannot be pushed up sufficiently depending on the weight of the airbag module 3, and if the angle exceeds 20 degrees, the airbag module 3 may be pushed up too much depending on the weight of the airbag module 3.

Figure 7:
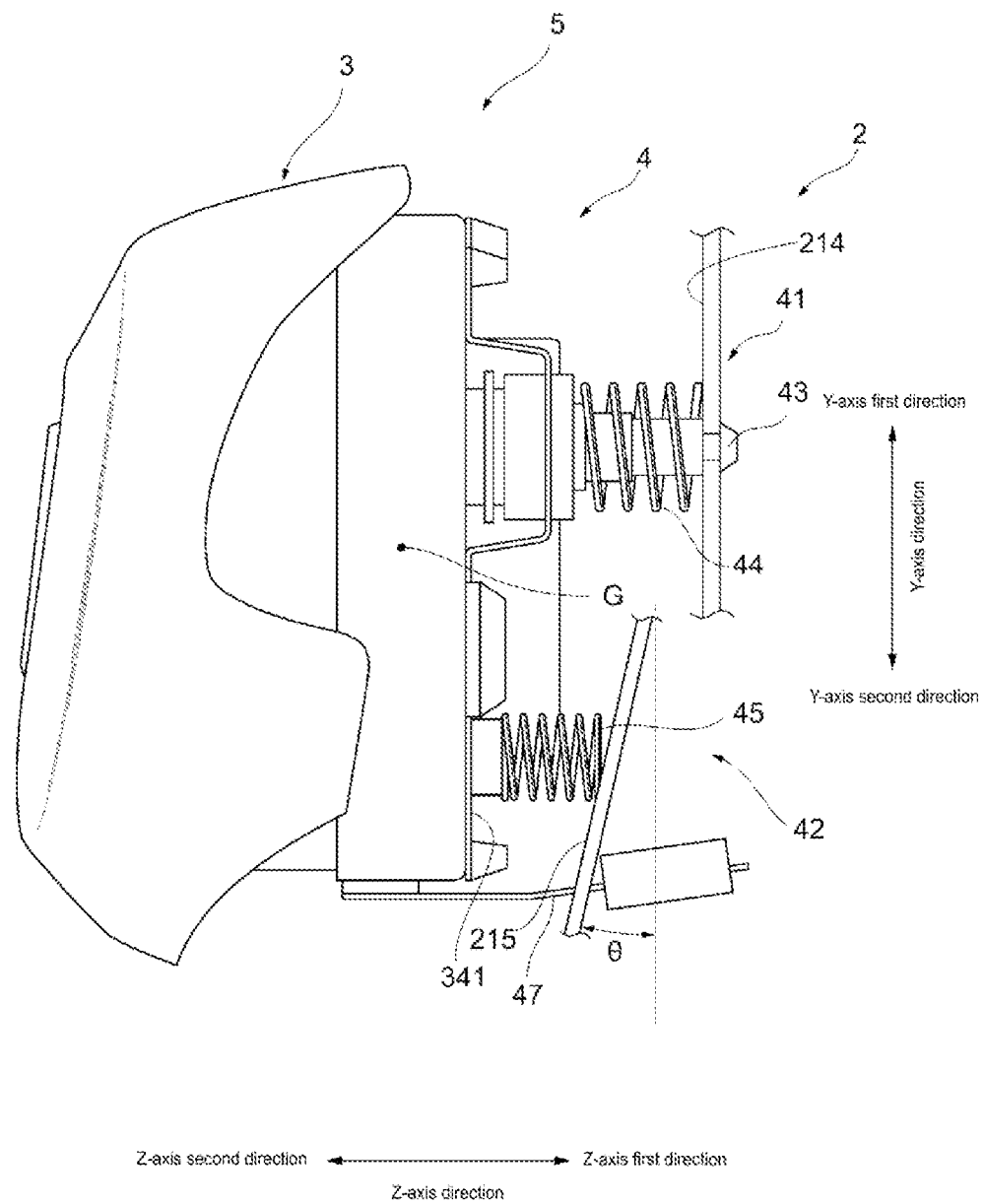
FIG. 7 is a side view of the steering wheel in FIG. 1 and illustrates a mounted state of the airbag module mounted to the steering wheel body via the damper unit.

In addition, the area of the bearing surface 215 is larger than the coil area defined by the coil diameter of the support springs 45 (see FIG. 7). This makes it easier to seat the free end of the support springs 45 on the bearing surface 215 when mounting the airbag damper assembly 5 to the steering wheel body 2. Further, after mounting, the support springs 45 use the inclined bearing surface 215 as a receiving surface, and the stability of contact with this receiving surface is easily ensured.

Functions of Damper Unit 4

Next, three functions of the damper unit 4 will be described with reference to FIGS. 7 and 8.

Engaging Function

The airbag module 3 is attached to the steering wheel body 2 by engaging with the damper mounting part 212 of the steering wheel body 2 via the damper unit 4. Specifically, the airbag module 3 is engaged with the steering wheel body 2 by inserting the two pins 43 of the damper unit 4 into the two mounting through-holes 213 of the steering wheel body 2 respectively. In the engaged state, the engaging part springs 44 are interposed between the airbag module 3 and the steering wheel body 2 around the pin 43 in the Z-axis direction. The airbag module 3 is movable in the Z-axis direction with respect to the steering wheel body 2 around the pin 43.

Damper Functions

The engaging part springs 44 are interposed between the airbag module 3 and the flat part 214 of the steering wheel body 2. The support springs 45 are interposed between the airbag module 3 and the bearing surface 215 of the steering wheel body 2. The plate-shaped damper 47 is interposed between the airbag module 3 and the flat part 217 of the steering wheel body 2. Therefore, when the steering wheel body 2 vibrates, the vibration is transmitted from the steering wheel body 2 to the airbag module 3 via the engaging part springs 44, the support springs 45, and the plate-shaped damper 47, and is dampened.

Push-up Function

Figure 8:
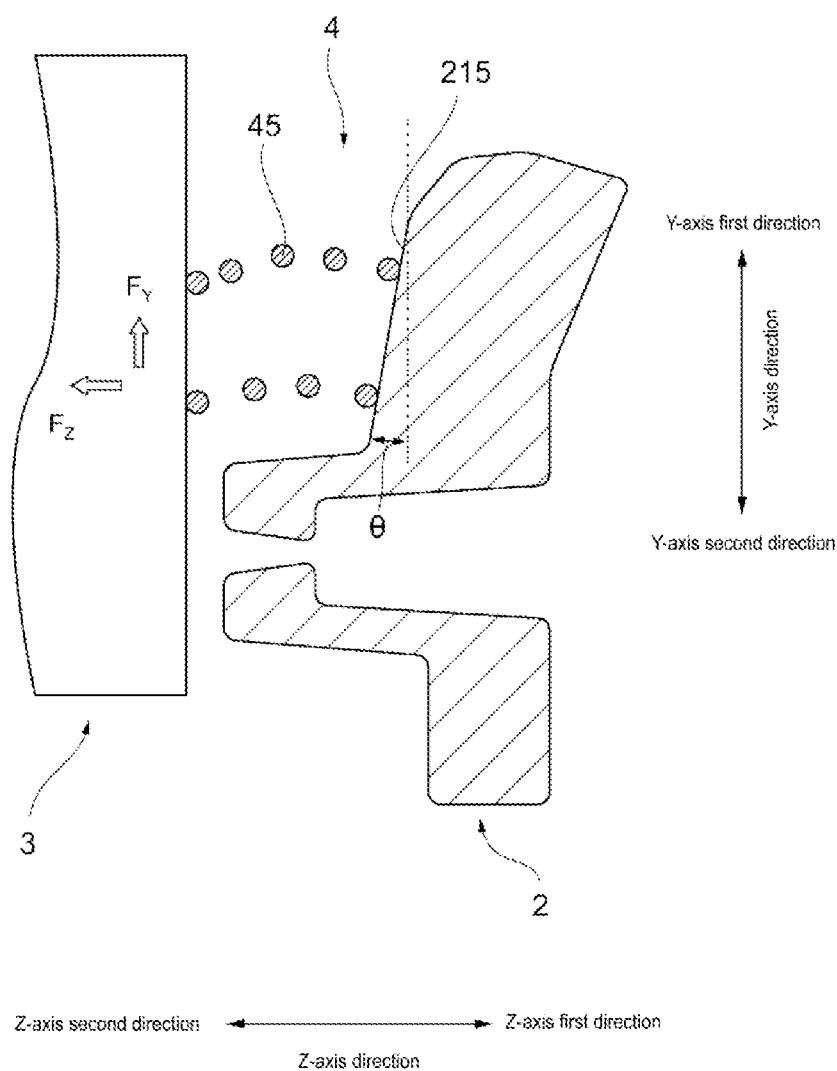
FIG. 8 is an enlarged cross-sectional view of the portion B of FIG. 7.

As illustrated in FIG. 8, the support springs 45 abut against the inclined bearing surface 215 and deform so that the longitudinal intermediate portion is bent in the Y-axis first direction. In other words, due to the inclined bearing surface 215, the support springs 45 are compressed more in the portion located in the Y-axis second direction than in the Y-axis first direction. Therefore, the partial elasticity of the portion of the support springs 45 positioned in the Y-axis second direction biasing the airbag module 3 is larger than the partial elasticity of another portion positioned in the Y-axis first direction of each of the support springs 45 biasing the airbag module 3. As a result, the resultant force F of the two elastic forces (in other words, the overall elastic force of the support springs 45) is directed in a direction that intersects the Z-axis direction and pushes up the airbag module 3. Specifically, the direction of the resultant force F is toward a range interposed between the Z-axis second direction and the Y-axis first direction. In addition, each support spring 45 is provided on the Y-axis second direction side of the center of gravity G of the airbag module 3 (see FIG. 3). Therefore, due to the action of the resultant force F having the direction described above, a moment in the clockwise direction in FIG. 7, or in other words a moment in a direction towards the Y-axis first direction, is input onto the airbag module 3. As a result, the resultant force F biases the airbag module 3 upward in the Y-axis first direction.

In addition, from the action of the component forces of the resultant force F, the resultant force F can be decomposed into two forces, a force component Fy directed in the Y-axis first direction and a force component Fz directed in the Z-axis second direction. Accordingly, the support springs 45 bias the airbag module 3 so as to push up the airbag module 3 in the Y-axis first direction perpendicular to the mounting direction (first direction, Z-axis direction).

According to Example 1 of Embodiment 1 described above, in a state in which the airbag module 3 is attached to the steering wheel body 2 via the damper unit 4, the damper unit 4 moves in the direction intersecting the mounting direction, and a force is applied to the airbag module 3 in the direction of pushing up the airbag module 3 (that is, the Y-axis first direction). As a result, the position of the airbag module 3 relative to the steering wheel body 2 (especially the position in the Y-axis direction) is suppressed from sliding down in the Y-axis second direction due to the weight of the airbag module 3, and can be held in the original attachment position thereof. Therefore, for example, the original positional relationship between the horn cover 33 and the steering wheel body 2 is maintained, and the design of the steering wheel 1 as a whole can be improved. In addition, the function of the damper unit 4 that connects the steering wheel body 2 and the airbag module 3 can be effectively used to push up the airbag module 3 as described above. Here, the function of the damper unit 4 is the function of the damper unit 4 damping the vibration while transmitting the vibration of the steering wheel body 2 to the airbag module 3.

In particular, the support springs 45, which are coil springs, in the damper unit 4 are used to bias the airbag module 3 in the upward direction. A simple configuration of such a coil spring can achieve a push-up function. In addition, since two support springs 45 are provided and positioned on both the left and right sides of the center of the airbag module 3, the airbag module 3 can be pushed up in a balanced manner in the left-right direction. Furthermore, since the support springs 45 are positioned below the center of gravity G of the airbag module 3, the airbag module 3 can be efficiently pushed up.

Also, since the bearing surface 215 that receives the support springs 45 is formed as an inclined surface, it is possible to apply a force component in the direction in which the airbag module 3 is pushed up. In addition, by adopting the bearing surface 215 which is an inclined surface, the support springs 45 can generate a force component in the direction of pushing up the airbag module 3 without being attached such that the center axis thereof is inclined with respect to the Z-axis direction. This reduces the space required between the airbag module 3 and the steering wheel body 2 when the support springs 45 are attached, which is advantageous for implementing a compact steering wheel 1.

Example 2

Figure 9A:
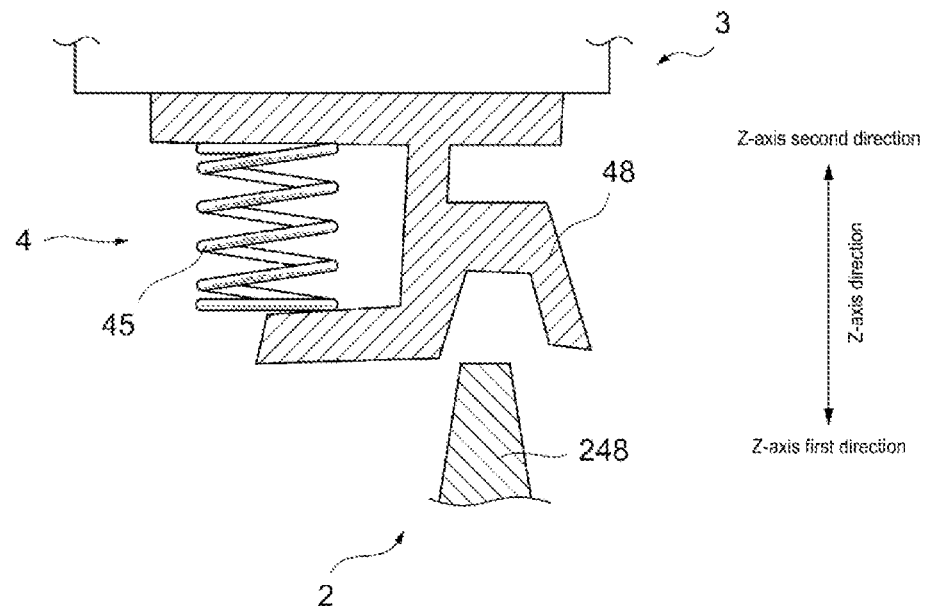
FIG. 9A is a diagram illustrating a state in which the stopper of the steering wheel according to Example 2 of Embodiment 1 is in the retention position.

Next, a temporary holding mechanism for the coil springs in the steering wheel 1 according to Example 2 of Embodiment 1 will be described with reference to FIGS. 9A and 9B. The steering wheel 1 according to Example 2 differs from the steering wheel 1 according to Example 1 in this temporary holding mechanism. The temporary holding mechanism is mainly composed of a stopper 48 and a stopper contact part 248. FIG. 9A illustrates a state in which the stopper 48 of the temporary holding mechanism is in a retention position, and FIG. 9B illustrates a state in which the stopper 48 has moved to the open position.

Figure 9B:
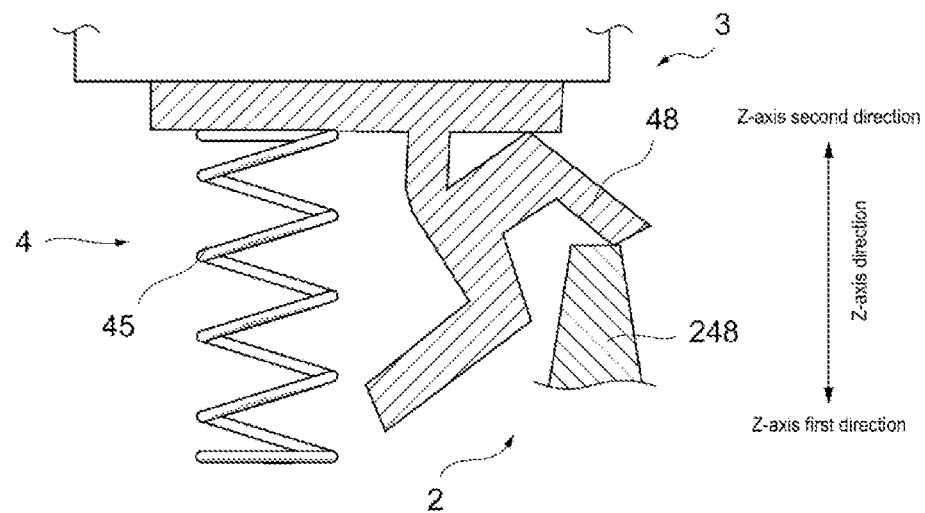
FIG. 9B is a diagram illustrating a state in which the stopper of FIG. 9A has moved to a released position.

The stopper 48 is configured to be movable between a retention position illustrated in FIG. 9A that retains the support springs 45 in a compressed state and a release position illustrated in FIG. 9B where the support springs 45 are released from the compressed state. The stopper 48 is provided, for example, as part of the damper unit 4 and is attached so as to protrude from the housing 34 first main surface 341 of the airbag module 3 in the Z-axis first direction. The stopper contact part 248 is provided on the steering wheel body 2 at a position corresponding to the stopper 48.

Before the airbag damper assembly 5 is attached to the steering wheel body 2, the stopper 48 contacts the free end (second end) of the support springs 45 and compresses and retains the support springs 45, as illustrated in FIG. 9A.

On the other hand, when the airbag damper assembly 5 is attached to the steering wheel body 2, the stopper 48 is brought into contact with the stopper contact part 248 and moved from the retention position to the release position. In other words, in the process in which the airbag damper assembly 5 approaches the steering wheel body 2 side in the Z-axis first direction, the stopper contact part 248 comes into contact with the stopper 48 close to the concave portion, and rotates the stopper 48 in the release direction.

As a result, after the airbag damper assembly 5 is attached to the steering wheel body 2, the stopper 48 moves away from the free end of the support springs 45 to release the support springs 45 from the compressed state, as illustrated in FIG. 9B. This release causes the support springs 45 to come into contact with the bearing surface 215 of the steering wheel body 2.

In this manner, according to the stopper 48 and the stopper contact part 248 according to Example 2 of Embodiment 1, it is possible to temporarily retain the posture of the support springs 45 of the airbag damper assembly 5 using a simple configuration. As a result, when the airbag damper assembly 5 is attached to the steering wheel body 2, the free-length support spring 45 contacts the steering wheel body 2 before the pin 43, which enables suppressing problems such as the pin 43 having difficulty being inserted into the steering wheel body 2 or having poor engagement. Further, when the airbag damper assembly 5 is attached to the steering wheel body 2, the support springs 45 can perform the damper function and push-up function by releasing the temporary hold.

Example 3

Next, Example 3 of Embodiment 1 will be described with reference to FIG. 10. The difference between the damper unit 4 according to Example 3 and the damper unit 4 according to Example 1 is the mounting method of the support spring 45 according to Example 3.

Figure 10:
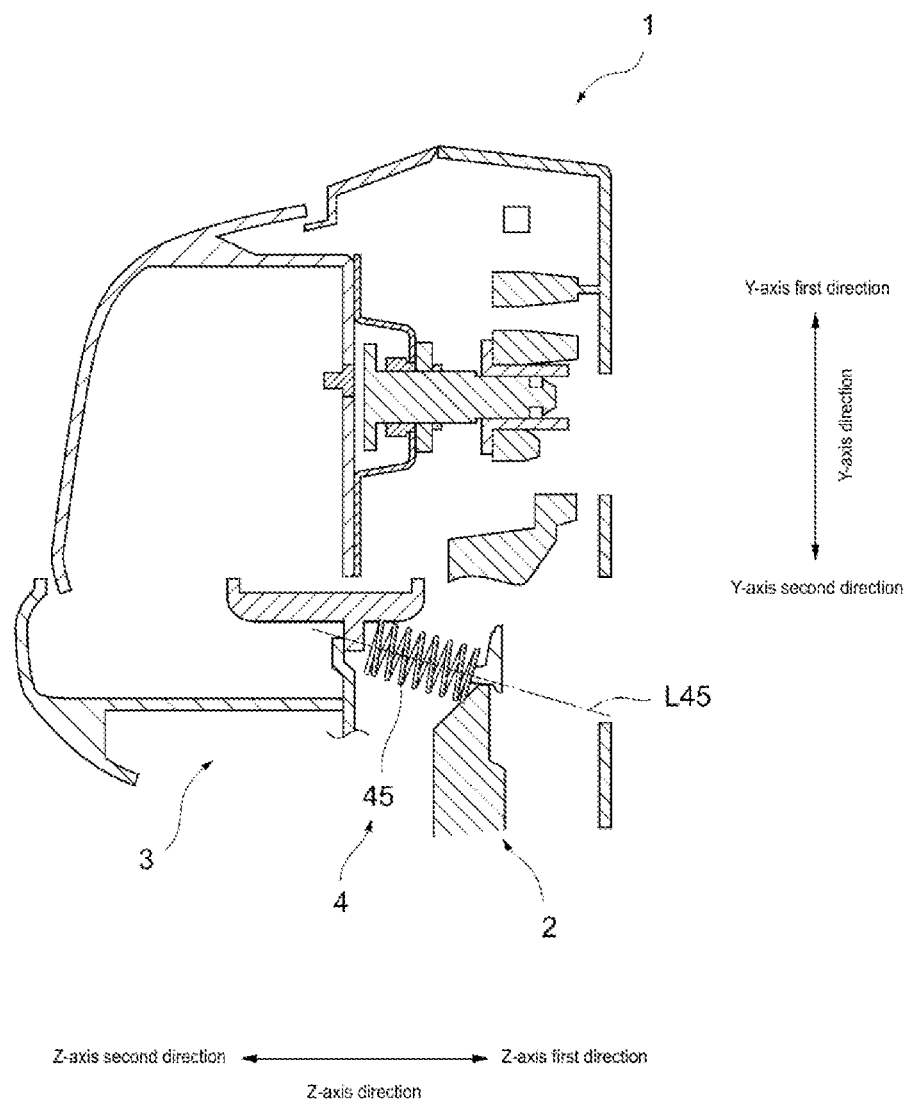
FIG. 10 is a side cross-sectional view illustrating a structure of a steering wheel damper unit according to Example 3 of Embodiment 1.

The support springs 45 are provided so that the center axis L45 thereof is inclined with respect to the Z-axis first direction, as illustrated in FIG. 10. Therefore, the support springs 45 can bias the airbag module 3 with an elastic force along the center axis L45. In other words, the airbag module 3 is pushed up in a direction intersecting the mounting direction by the action of the support springs 45. In this case, the bearing surface 215 of the steering wheel body 2 does not need to be provided with an inclined surface.

Thus, the support springs 45 of the damper unit 4 according to Example 3 can also push up the airbag module 3.

Example 4

Next, Example 4 of Embodiment 1 will be described with reference to FIG. 11. The difference between the damper unit 4 according to Example 4 and the damper unit 4 according to Example 1 is the mounting method of the pins 43 and the engaging part springs 44 according to Example 4.

Figure 11:
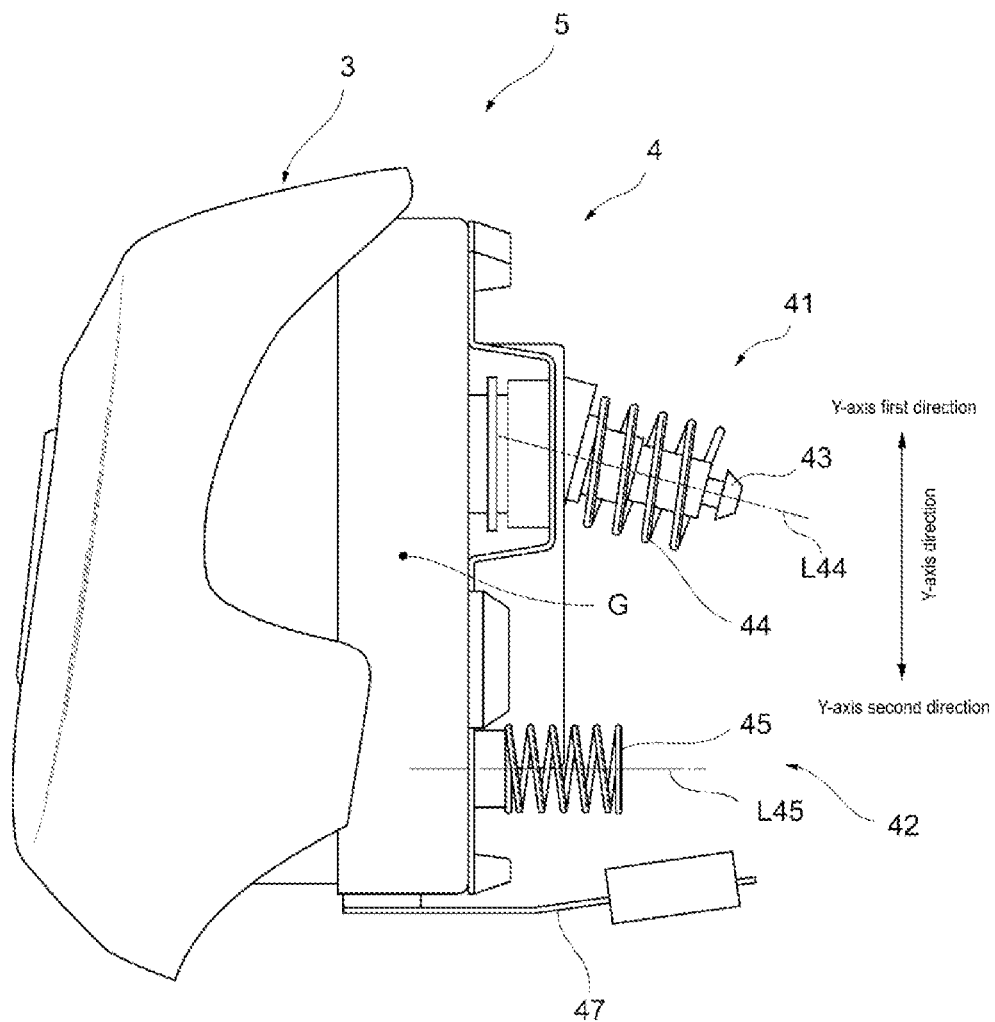
FIG. 11 is a side view illustrating a structure of a steering wheel damper unit according to Example 4 of Embodiment 1.

As illustrated in FIG. 11, the engaging part springs 44 are provided so that the center axis L44 is inclined with respect to the Z-axis first direction. The pins 43 are also provided in the same manner. Therefore, the engaging part springs 44 can bias the airbag module 3 with an elastic force along the center axis L44. In other words, the airbag module 3 is pushed up in a direction intersecting the mounting direction by the action of the engaging part springs 44. In the present Embodiment, the support springs 45 are provided so that the center axis L45 is parallel to the Z-axis first direction.

Thus, pushing up of the airbag module 3 can also be achieved by the engaging part springs 44 of the damper unit 4 according to Example 4.

Example 5

Next, Example 5 of Embodiment 1 will be described with reference to FIGS. 12 to 14. The main differences between the damper unit 4 according to Example 5 and the damper unit 4 according to Example 1 are the number of pins 43 and engaging part springs 44, the number of support springs 45, and the configuration of the damper mounting part 212 of the steering wheel body 2.

Figure 12:
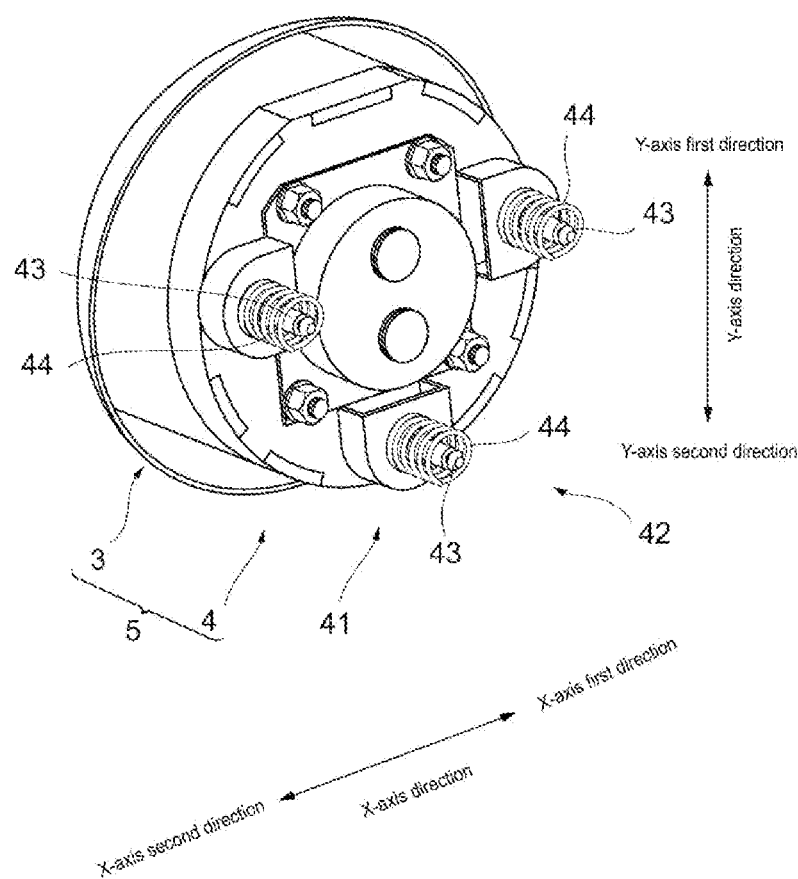
FIG. 12 is a perspective view illustrating a structure of a steering wheel damper unit according to Example 5 of Embodiment 1.

The damper unit 4 has three pins 43 and three engaging part springs 44 as illustrated in FIG. 12, but does not have any support springs 45. In addition, as illustrated in FIG. 14, the damper mounting part 212 has three mounting through-holes 213 and three flat parts 214 to correspond to the three pins 43 and three engaging part springs 44. Each of the three pins 43 is provided on both sides of the first main surface 341 of the housing 34 in the X-axis direction and in the Y-axis second direction. In other words, the three pins 43 are arranged in the directions of 3 o'clock, 6 o'clock and 9 o'clock (on an analog 12-hour clock) on a plane orthogonal to the Z-axis direction. The two pins 43 arranged in the 3 o'clock and 9 o'clock directions are positioned above the center of gravity of the airbag module 3, and the pin 43 arranged in the 6 o'clock direction is positioned on the lower side of the center of gravity of the airbag module 3. Also, each of the three engaging part springs 44 are similarly provided.

Figure 13:
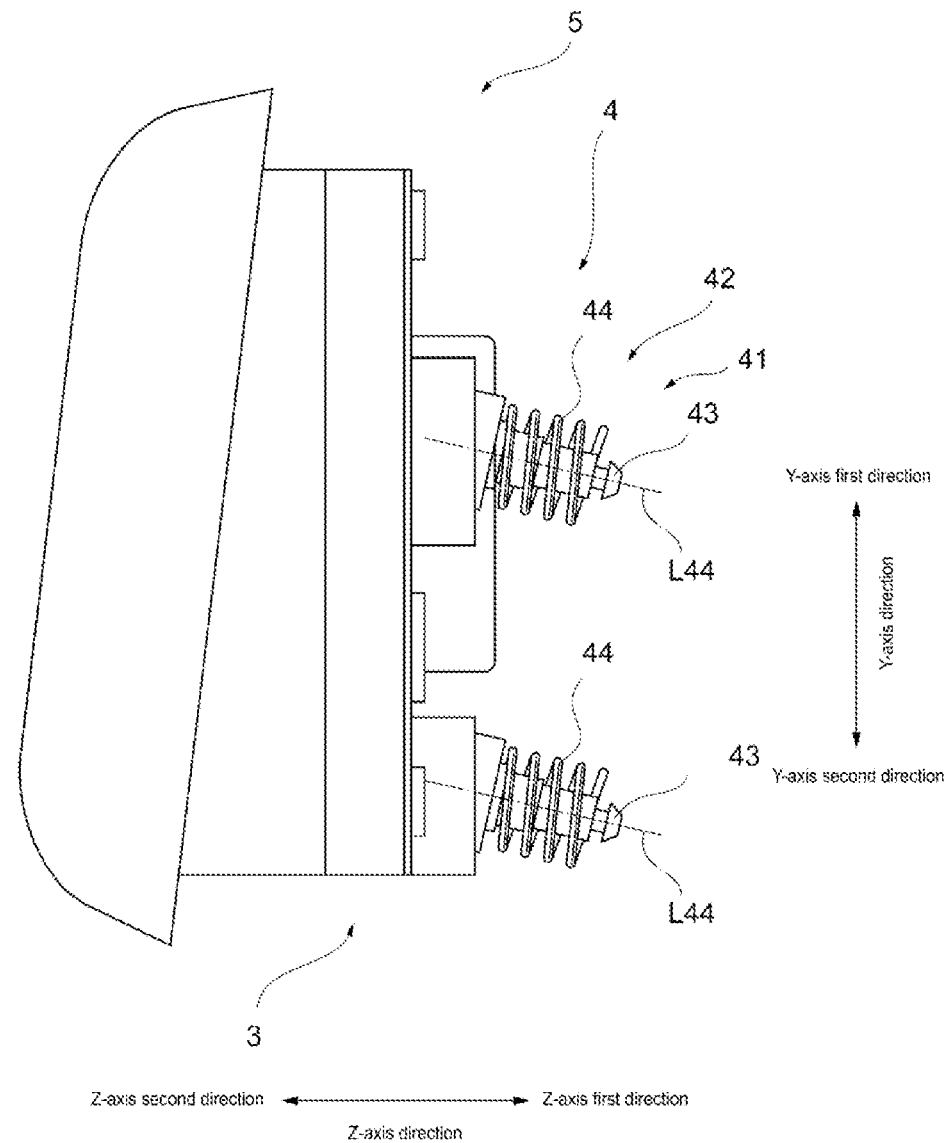
FIG. 13 is a side view illustrating the structure of a damper unit of the steering wheel of FIG. 12.
Figure 14:
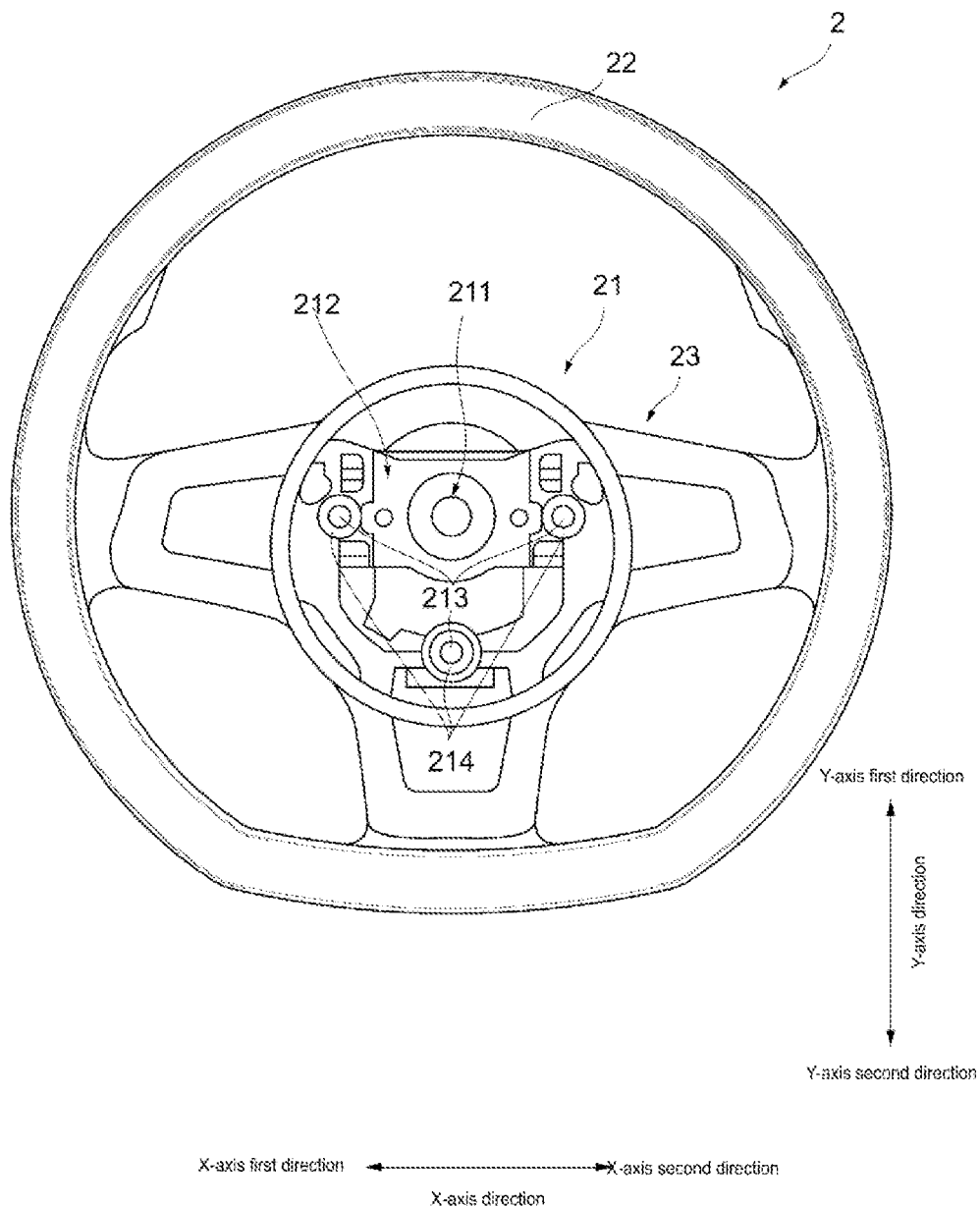
FIG. 14 is a front view illustrating the steering wheel body according to Example 5 of Embodiment 1.

As illustrated in FIG. 13, each engaging part spring 44 is provided such that the center axis L44 thereof is inclined with respect to the Z-axis first direction. Each pin 43 is similarly provided. Therefore, the three engaging part springs 44 can bias the airbag module 3 with an elastic force along the center axis L44. In other words, the airbag module 3 is pushed up in a direction intersecting the mounting direction by the action of the engaging part springs 44.

Thus, with the three engaging part springs 44 of the damper unit 4 according to Example 5, the airbag module 3 can be pushed up more stably. Of the three engaging part springs 44, preferably the two engaging part springs 44 arranged in the 3 o'clock and 9 o'clock directions or the one engaging part spring 44 arranged in the 6 o'clock direction are arranged in the inclined arrangement described above; thus, the airbag module 3 may be pushed up in a direction intersecting the installation direction.

Embodiment 2

Example 1

Figure 15:
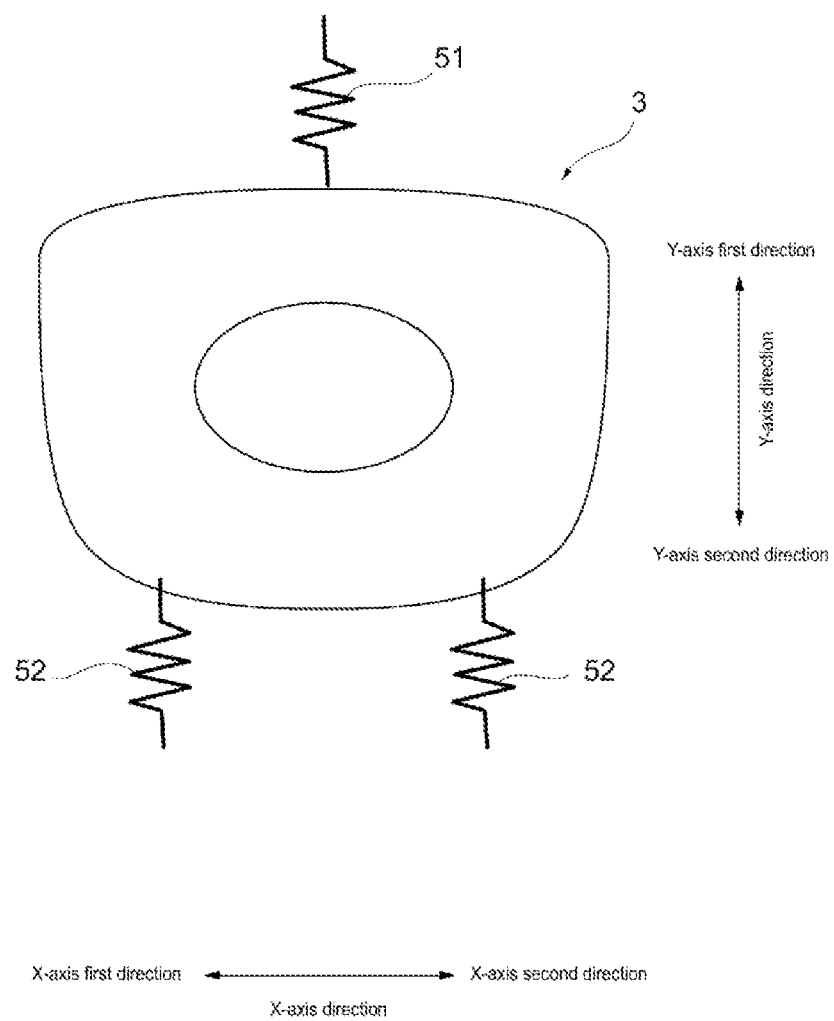
FIG. 15 is a front view illustrating the steering wheel according to Example 1 of Embodiment 2.
Figure 16:
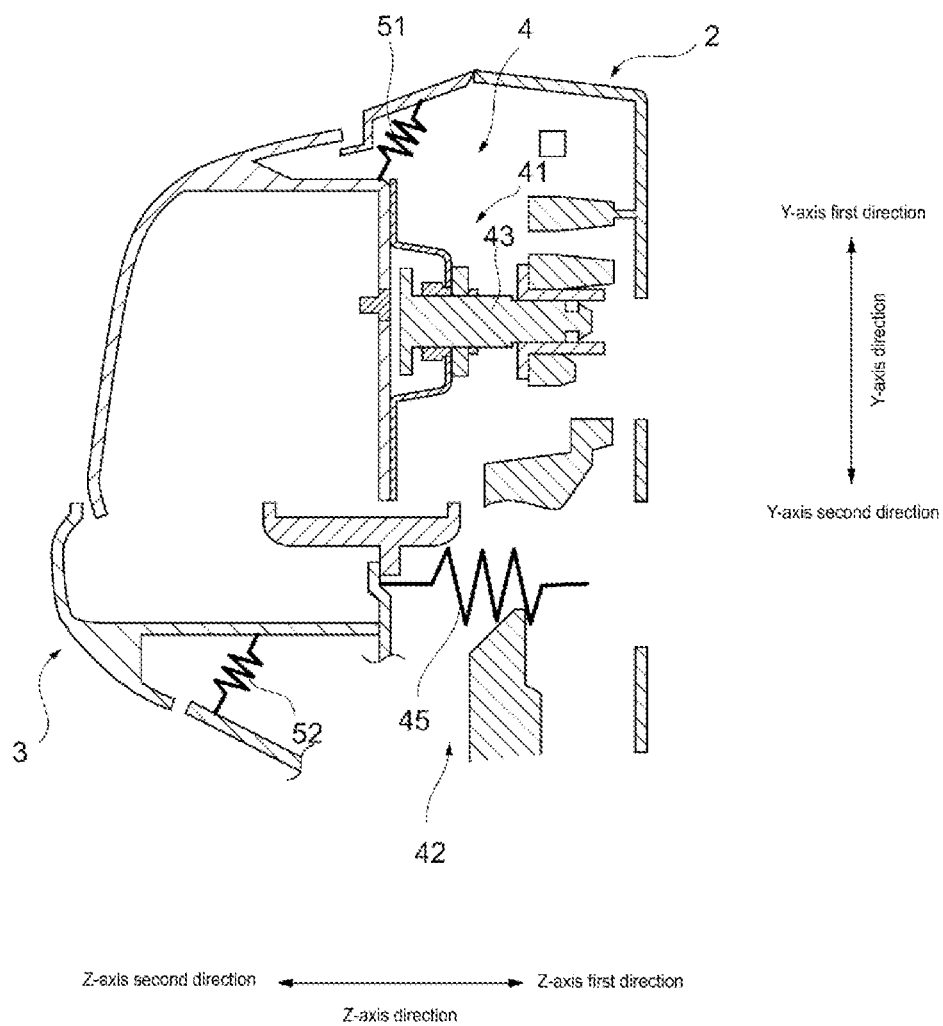
FIG. 16 is a side view illustrating the structure of the steering wheel in FIG. 15.

Next, Example 1 of Embodiment 2 will be described with reference to FIGS. 15 and 16. The difference between the steering wheel 1 according to Example 1 of Embodiment 2 and the steering wheel 1 according to Example 1 of Embodiment 1 is that the former further has support springs 51 and/or support springs 52, and a different attachment method of the support springs 45.

The support springs 45 are provided such that the center axis L45 thereof is parallel to the Z-axis first direction. In Embodiment 2, the support springs 51 and/or support springs 52 function as at least one elastic body that pushes up the airbag module 3 in a direction intersecting the mounting direction. At least one such elastic body is located on at least one of the upper side and the lower side when viewed from the center of the airbag module 3.

The support springs 51 are, for example, tension coil springs provided on the Y-axis first direction side of the airbag module 3. The support springs 51 connect the end part of the airbag module 3 in the Y-axis first direction and the end part of the steering wheel body 2 in the Y-axis first direction, biasing the airbag module 3 in a manner that pulls up the airbag module 3.

The support springs 52 are, for example, compression coil springs provided on the Y-axis second direction side of the airbag module 3. The support springs 52 connect the end part of the airbag module 3 in the Y-axis second direction and the end part of the steering wheel body 2 in the Y-axis second direction, biasing the airbag module 3 in a manner of pushing up the airbag module 3.

Thus, with the support springs 51 and/or support springs 52 according to Example 1 of Embodiment 2, the airbag module 3 can be pulled up and/or pushed up. Therefore, sliding down of the airbag module 3 due to its own weight can be suppressed, and the creative look of the steering wheel as a whole can be improved. In addition, it is possible to use or follow the mounting method of the support springs 45 that is conventionally employed for front airbags. Therefore, the degrees of freedom in designing the steering wheel 1 can be increased.

Example 2

Figure 17:
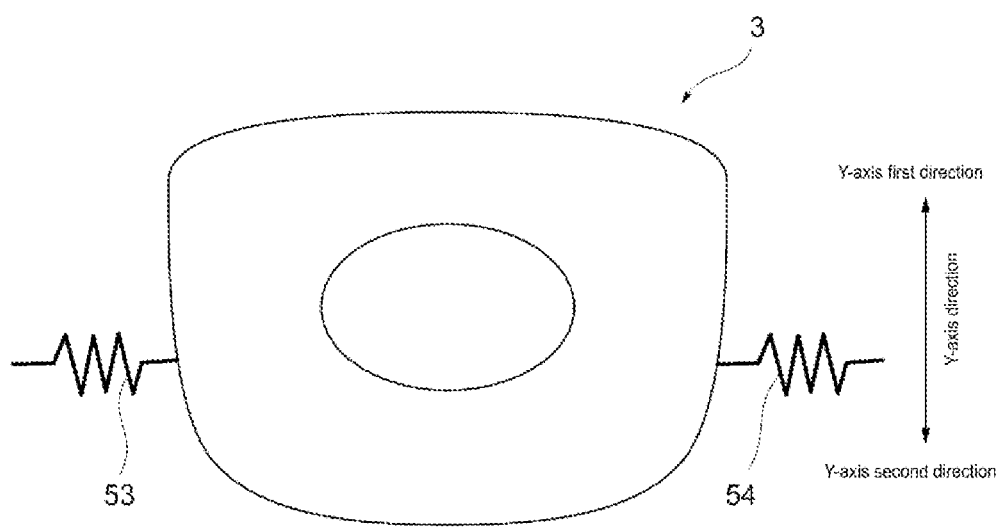
FIG. 17 is a front view illustrating the steering wheel according to Example 2 of Embodiment 2.

Next, Example 2 of Embodiment 2 will be described with reference to FIG. 17. In Embodiment 2, the difference between the steering wheel 1 according to Example 2 and the steering wheel 1 according to Example 1 is that the former has support springs 53 and support springs 54 in place of the support springs 51 and/or support springs 52.

The support springs 53 and support springs 54 are arranged on both left and right sides of the airbag module 3 when viewed from the center, and function as elastic bodies that push up the airbag module 3 in a direction intersecting the mounting direction. For example, each of the support springs 53 and support springs 54 is a tension coil spring provided on both sides of the airbag module 3 in the X-axis direction. The support springs 53 connect the end part of the airbag module 3 on the X-axis first direction side and the end part of the steering wheel body 2 on the X-axis first direction side. The support springs 54 connect the end part of the airbag module 3 on the X-axis second direction side and the end part of the steering wheel body 2 on the X-axis second direction side. These connections bias the airbag module 3 in a manner to pull the airbag module 3 upward.

Thus, the support springs 53 and support springs 54 according to Example 2 can also pull up the airbag module 3 and suppress the airbag module 3 from sliding down due to its own weight.

Embodiment 3

Figure 18:
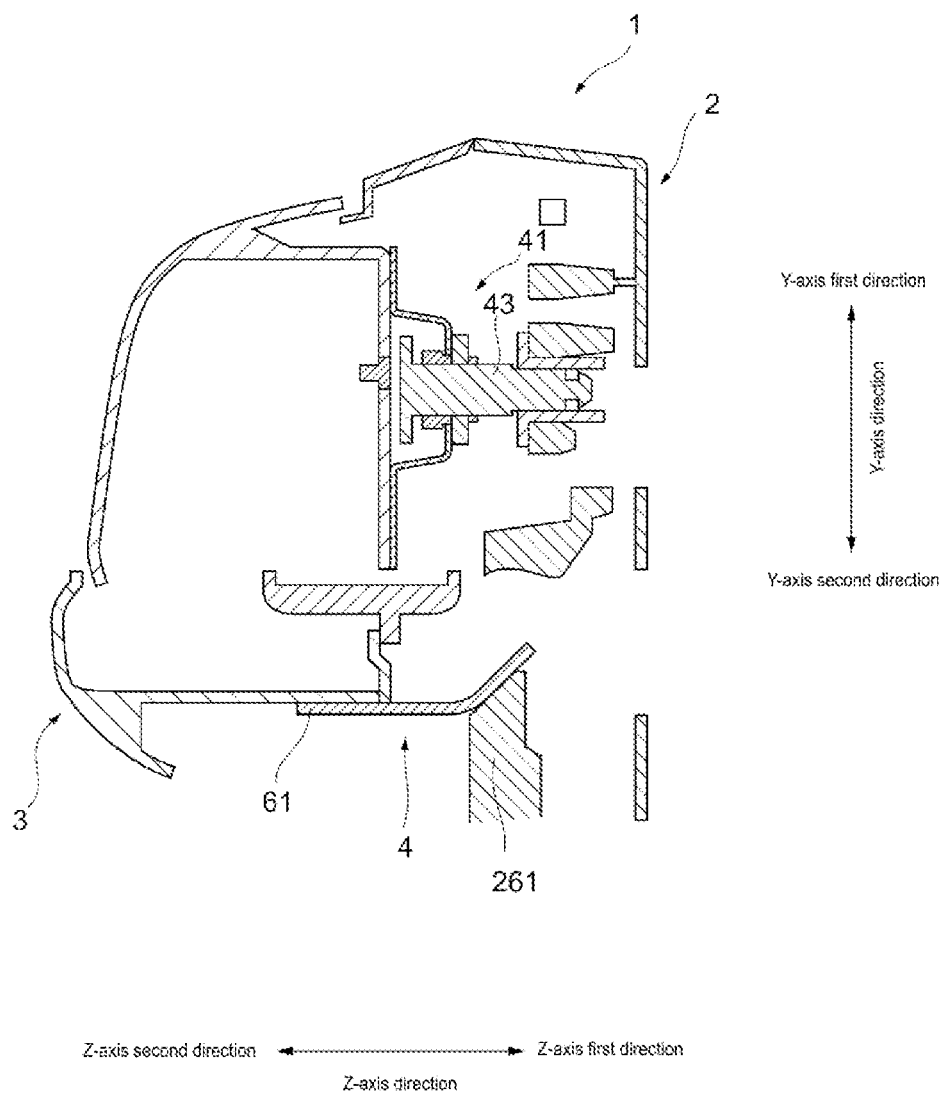
FIG. 18 is a side view illustrating the structure of the steering wheel according to Embodiment 3.

Next, Embodiment 3 will be described with reference to FIG. 18. The difference between the steering wheel 1 according to Embodiment 3 and the steering wheel 1 according to Embodiment 1 is that the former does not have support springs 45, but instead has seat springs 61 for supporting the airbag module 3. The seat spring 61 may be configured the same as the plate-shaped damper 47 (see FIG. 3) according to Embodiment 1, or may be configured as a separate member. Here, they are assumed to be separate.

The seat spring 61 functions as an elastic body that pushes up the airbag module 3 in a direction intersecting the mounting direction. For example, the seat spring 61 is a leaf spring and is provided at the end of the airbag module 3 in the Y-axis second direction. In addition, the seat spring 61 is positioned on the lower side when viewed from the center of the airbag module 3. In the mounted state, the seat spring 61 contacts the contact portion 261 of the steering wheel body 2 and pushes up the airbag module 3 in a direction intersecting the mounting direction. As a result, sliding down of the airbag module 3 in the Y-axis second direction due to its own weight is suppressed.

In this manner, the seat springs 61 according to Embodiment 3 can also retain the position of the airbag module 3 with respect to the steering wheel body 2 (especially the position in the Y-axis direction) at the original mounting position. Moreover, since the configuration of the seat spring 61 is simple, the size of the steering wheel 1 can be reduced and the configuration of the steering wheel 1 can be simplified.

Other Modified Examples

The Embodiments and Examples described above are for ease of understanding of the present invention and are not intended to be construed as limiting the present invention. Elements included in the embodiment, as well as arrangements, materials, conditions, shapes, sizes, and the like thereof, are not limited to those exemplified, but rather can be appropriately changed.

For example, in the damper unit 4, the damper part 42 is mainly composed of coil springs, but is not limited to such a configuration, and may be composed of other elastic members such as rubber.

Although the inclined surface of the bearing surface 215 has been described as having a flat configuration inclined at a prescribed angle with respect to the XY plane, it may have a configuration other than a planar configuration. That is, the inclined surface of the bearing surface 215 may be configured to have a concave surface, a convex surface, a curved surface, or a stepped surface.

The inclined surface of the bearing surface 215 may be provided on the airbag module 3 side instead of on the steering wheel body 2 side or as well as on the steering wheel body 2 side. Further, the inclined surface of the bearing surface on the steering wheel body 2 side and/or the airbag module 3 side may be formed by a part of the steering wheel body 2 or the airbag module 3, or may be formed by a separate body attached to them (a collar, for example).

Although the number of pins 43 is described as two or three, the number is not limited to the above configuration. For example, the number of pins 43 may be one or four or more. Similarly, the number of each of the support springs 45, support springs 51, support springs 52, support springs 53, support springs 54, and the engaging part springs 44 also may be one or four or more.

EXPLANATION OF CODES

1. Steering wheel; 2. Steering wheel body; 3. Airbag module; 4. Damper unit; 5. Airbag damper assembly; 21. Boss region; 22. Rim; 23. Spokes; 31. Airbag cushion; 32. Inflator; 33. Horn cover; 34. Housing; 41. Engaging part; 42. Damper part; 43. Pin; 44. Engaging part spring; 45. Support spring; 47. Plate-shaped damper; 48. Stopper; 51 to 54. Support springs; 61. Seat spring; 211. Shaft mounting part; 212. Damper mounting part; 213. Mounting through-hole; 214. Plan view; 215. Bearing surface; 217. Flat part; 248. Stopper contact part; 341. First principal plane; G. Center of gravity; S. Steering shaft.

The invention claimed is:
1. A steering wheel comprising:
a steering wheel body;
an airbag module; and
a damper unit connecting the steering wheel body and the airbag module and provided between the airbag module and the steering wheel body, the damper unit comprising:
at least one coil spring including:
a first end part secured to an airbag module bearing surface;
a second end that is unsecured relative to the airbag module and the steering wheel body, the second end configured to contact a steering wheel body bearing surface;
wherein the airbag module is mounted on the steering wheel body via the damper unit in a first direction, and
the damper unit is configured to apply a force on the airbag module in a direction of pushing up the airbag module that is a direction that intersects with the first direction in a state where the airbag module is mounted on the steering wheel body.

2. The steering wheel according to claim 1, wherein at least one of the airbag module or the steering wheel body is prepared with an inclined surface on a bearing surface for receiving the at least one coil spring that applies a force component on the at least one coil spring in the direction of pushing up the airbag module.

3. The steering wheel according to claim 2, wherein of the airbag module and the steering wheel body, the inclined surface is provided on the steering wheel body.

4. The steering wheel according to claim 1, wherein the at least one coil spring includes an inclined surface on at least one of a first end in contact with the airbag module or a second end in contact with the steering wheel body applying a force component on the at least one coil spring in the direction of pushing up the airbag module.

5. The steering wheel according to claim 1, wherein the at least one coil spring is provided such that the center axis thereof is inclined relative to the first direction.

6. The steering wheel according to claim 1, wherein the at least one coil spring is provided at a position below the center of gravity of the airbag module.

7. The steering wheel according to claim 1, wherein the at least one coil spring is provided in at least one of left or right positions of the center of the airbag module.

8. The steering wheel according to claim 1, wherein the surface area of the steering wheel body bearing surface is larger than the coil surface area demarcated by the coil diameter.

9. The steering wheel according to claim 1, wherein
the coil spring is a compression coil spring and the coil spring includes:
the first end part secured to the bearing surface of the airbag module, and
the second end part that is not secured to the steering wheel body;
the steering wheel includes:
a stopper that is movable between a retention position that contacts the second end part of the coil spring and retains the coil spring in a compressed state and a release position spaced from the second end part of the coil spring that releases the compressed state of the coil spring, and
a stopper contact part provided on the steering wheel body; and
the stopper contact part is configured to make contact with the stopper when the airbag module is mounted to the steering wheel body via the damper unit and move the stopper from the retention position to the release position enabling the second end part of the coil spring to thereby come into contact with the bearing surface of the steering wheel body.

10. The steering wheel according to claim 1, wherein the damper unit is provided between the airbag module and the steering wheel body and includes at least one seat spring that biases the airbag module, pushing up the airbag module in the aforementioned direction.

11. The steering wheel according to claim 10, wherein the seat spring is provided on the underside of the airbag module.

12. The steering wheel of claim 1, wherein the damper unit further comprises a damper configured to dampen vibrations of the airbag module.

* * * * *